United States Patent
Ningrat

(10) Patent No.: US 9,244,560 B2
(45) Date of Patent: Jan. 26, 2016

(54) MULTIPLE ROW RECEIVING LINE PATTERN FOR IN-CELL TOUCHSCREEN PANELS

(71) Applicant: STMicroelectronics Asia Pacific Pte. Ltd., Singapore (SG)

(72) Inventor: Kusuma Adi Ningrat, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 227 days.

(21) Appl. No.: 13/862,562

(22) Filed: Apr. 15, 2013

(65) Prior Publication Data

US 2014/0306921 A1  Oct. 16, 2014

(51) Int. Cl.
*G06F 3/044* (2006.01)
*G06F 3/041* (2006.01)

(52) U.S. Cl.
CPC .............. *G06F 3/0412* (2013.01); *G06F 3/044* (2013.01); *G06F 2203/04112* (2013.01)

(58) Field of Classification Search
CPC ....................................... G06F 3/044
USPC ................................. 345/156–175
See application file for complete search history.

(56) References Cited

U.S. PATENT DOCUMENTS

| | | | |
|---|---|---|---|
| 2009/0085891 A1* | 4/2009 | Yang et al. | 345/174 |
| 2013/0147724 A1* | 6/2013 | Hwang et al. | 345/173 |
| 2013/0307815 A1* | 11/2013 | Chang | 345/174 |
| 2013/0335365 A1* | 12/2013 | Kim et al. | 345/174 |

* cited by examiner

*Primary Examiner* — Grant Sitta
(74) *Attorney, Agent, or Firm* — Gardere Wynne Sewell LLP

(57) ABSTRACT

An in-cell touchscreen panel includes columns of transmit electrodes and rows of sensing electrodes, wherein each row of sensing electrodes comprises a first subset of sensing electrodes coupled to control circuitry via a first subset of receiving traces and a second subset of sensing electrodes coupled to the control circuitry via a second subset of receiving traces. To enable multi-touch functionality, the in-cell touchscreen panel operates in a scanning mode where capacitance is measured at each node where the sensing electrodes intersect the transmit electrodes. During the scanning mode, the control circuitry senses the first and second subsets of receiving traces while applying drive signals to pairs of transmit electrodes. After a drive signal has been applied to each of the transmit electrodes, each of the nodes are measured to detect a capacitance. This capacitance is indicative of a user touch on the in-cell touchscreen panel.

18 Claims, 6 Drawing Sheets

MULTIPLE ROW RECEIVING LINE PATTERN FOR IN-CELL TOUCHSCREEN PANELS

FIELD OF THE INVENTION

The present disclosure generally relates to capacitive touchscreen panels and, more particularly, to an in-cell touchscreen panel that implements a pattern having rows of sensors, wherein each row of sensors is coupled to two or more receiving traces.

BACKGROUND

Many touchscreen panels now incorporate in-cell technology, wherein capacitive touch sensors are integrated into the display circuitry of the touchscreen panel. Such a touchscreen panel is referred to herein as an in-cell touchscreen panel and includes in-cell touch sensors and a display portion. The in-cell touch sensors comprising an in-cell touchscreen panel are designed as a matrix of transmit electrodes and sensing electrodes intersecting at nodes, wherein the transmit electrodes are coupled to control circuitry via transmit traces and the sensing electrodes are coupled to the control circuitry via receiving traces. To detect a user touch, a conventional in-cell touchscreen panel operates in a scanning mode wherein capacitance at the intersecting nodes is measured by simultaneously sampling all rows of receiving traces and then individually applying a drive signal to each of the transmit traces, one column at a time. In-cell touch sensors typically operate in sync with the display circuitry of the in-cell touchscreen panel. Therefore, the scanning time for detecting a user touch is limited to the refresh rate of the display portion of the in-cell touchscreen panel.

The number of receiving traces comprising an in-cell touchscreen panel is generally limited to no more than the number of transmit traces, and is oftentimes less than the number of transmit traces. As the number of transmit traces increases, the time required to complete the scanning mode also increases. The increased duration of the scanning process can be problematic due to the timing constraints set by the refresh rate of the display. When the scanning mode requires more time than is allowed by the refresh rate of the display, the sampling efficiency is reduced, and the touch-detection output is more susceptible to noise and may have a lower signal-to-noise ratio (SNR).

SUMMARY

The present disclosure provides an in-cell touchscreen panel, comprising: a plurality of transmit electrodes each extending in a first direction along a display portion of the in-cell touchscreen panel; and one or more rows of sensing electrodes extending in a second direction along the display portion of the in-cell touchscreen panel substantially perpendicular to the first direction and intersecting the plurality of transmit electrodes, each row of sensing electrodes comprising a first subset of sensing electrodes coupled to one of a first subset of receiving traces and a second subset of sensing electrodes coupled to one of a second subset of receiving traces.

In another embodiment, the present disclosure provides an in-cell touchscreen panel, comprising: one or more pairs of transmit electrodes, each pair of transmit electrodes comprising a first transmit electrode extending in a first direction along a display portion of the in-cell touchscreen panel and a second transmit electrode extending in the first direction along the display portion of the in-cell touchscreen panel; and one or more rows of sensing electrodes extending in a second direction along the display portion of the in-cell touchscreen panel substantially perpendicular to the first direction and intersecting the one or more pairs of transmit electrodes, each row of sensing electrodes comprising a first subset of sensing electrodes each intersecting a first transmit electrode and a second subset of sensing electrodes each intersecting a second transmit electrode.

In yet another embodiment, the present disclosure provides a method for detecting a user touch using an in-cell touchscreen panel, the method comprising: receiving sensing signals via a plurality of receiving traces, wherein a first subset of the receiving traces are coupled to first sensing electrodes in rows extending in a first direction along a display portion of the in-cell touchscreen panel and a second subset of the receiving traces are coupled to second sensing electrodes in the rows extending in the first direction along the display portion of the in-cell touchscreen panel; applying drive signals to pairs of transmit electrodes, each pair of transmit electrodes including a first transmit electrode extending in a second direction along the display portion of the in-cell touchscreen panel substantially perpendicular to the first direction and a second transmit electrode extending in the second direction; and measuring a capacitance formed at nodes where one or more of the first sensing electrodes intersect the first transmit electrode and at nodes where one or more of the second sensing electrodes intersect the second transmit electrode.

Another embodiment of the present disclosure provides an apparatus comprising: a display portion having a plurality of pixels arranged in an array; a plurality of sensor electrodes comprising a mesh defining a plurality of openings, the plurality of sensor electrodes extending in a first direction along the display portion and positioned such that individual ones of the pixels are each positioned at one of the openings of the mesh; and a plurality of transmit electrodes each extending in a second direction along the display portion and intersecting the plurality of sensor electrodes.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE EMBODIMENTS

Figure 1:
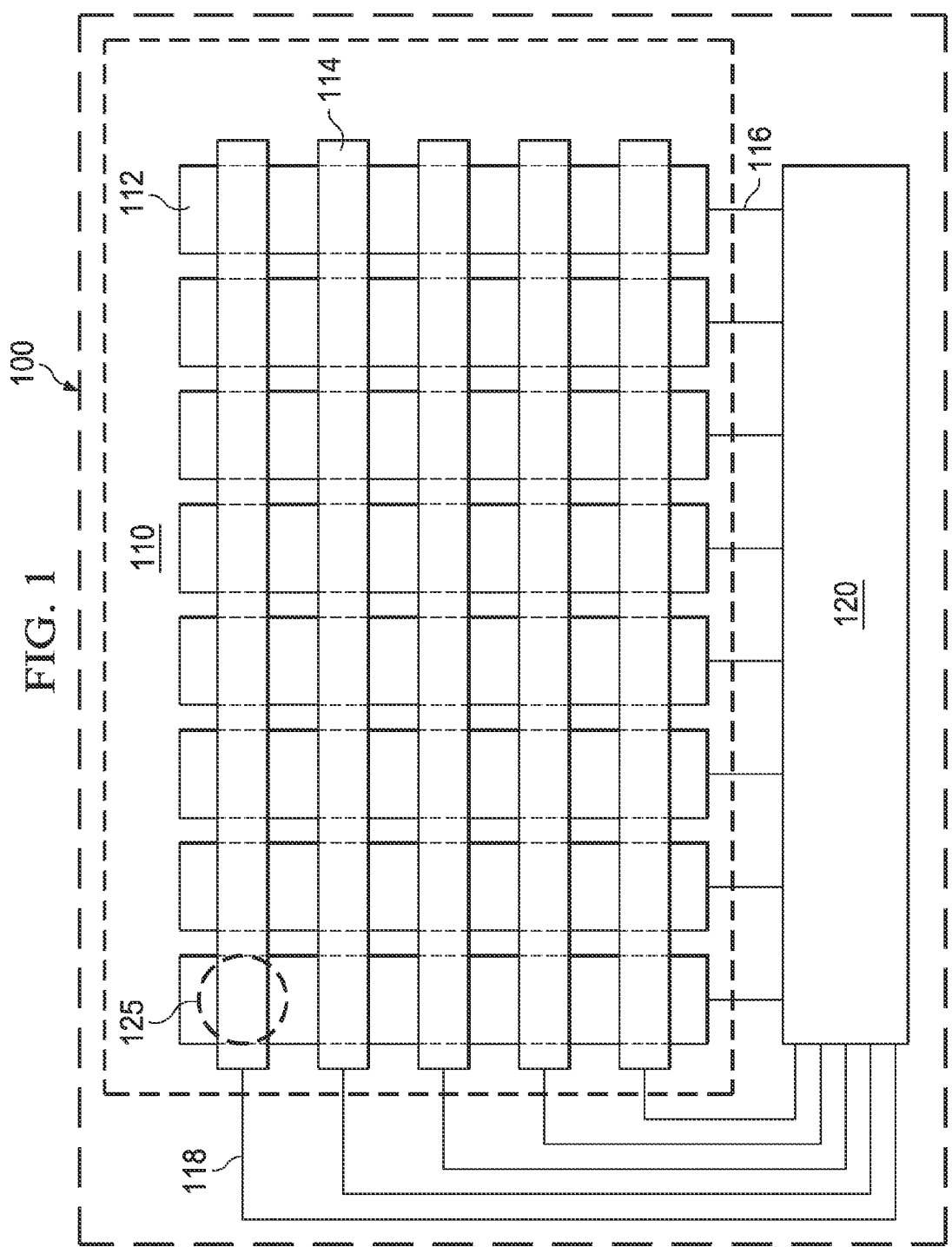
FIG. 1 illustrates an example of a conventional in-cell touchscreen panel.

FIG. 1 illustrates an example of a conventional in-cell touchscreen panel 100, such as that typically installed in an electronic device such as a smart phone, GPS device, tablet computer, mobile media player, remote control device, or any other device capable of using an in-cell touchscreen panel. The in-cell touchscreen panel 100 includes an active portion 110 capable of displaying content and detecting a user touch. Disposed within the perimeter of the active portion 110, the in-cell touchscreen panel 100 includes columns of transmit electrodes 112 and rows of sensing electrodes 114. Each column of transmit electrodes 112 is coupled to one of a set of transmit traces 116 that are, in turn, coupled to control circuitry 120. Additionally, each row of sensing electrodes 114 is coupled to one of a set of receiving traces 118 that are, in turn, coupled to the control circuitry 120. The control circuitry 120 may include circuitry for providing a drive signal to the transmit electrodes 112 via transmit traces 116. The control circuitry 120 may also include circuitry for receiving sense signals via receiving traces 118, wherein the sense signals are indicative of sensed capacitance generated at nodes (e.g., node 125 in FIG. 1) where the sensing electrodes 114 intersect the transmit electrodes 112. The control circuitry 120 may also include logic circuitry for processing signals and conveying touch information to other parts of the electronic device, such as a processor.

To enable multi-touch functionality, the conventional in-cell touchscreen panel 100 operates in a scanning mode to measure the capacitance at each node where the sensing electrodes 114 intersect the transmit electrodes 112 (e.g., node 125 in FIG. 1). To do this, the control circuitry 120 simultaneously senses all the receiving traces 118 while applying a drive signal to the transmit trace 116 of each transmit electrode 112, one transmit trace 116 at a time. After a drive signal has been applied to each of the transmit electrodes 112, the capacitance at each of the nodes is measured to detect a capacitance at any of the nodes. This capacitance is indicative of a user touch on the in-cell touchscreen panel 100.

In accordance with the embodiment discussed above with respect to FIG. 1, the sensing time ($t_s$) for operating in the above scanning mode to enable multi-touch functionality may be calculated in accordance with the following equation: $t_s = N \ast t_{TX}$, where N is the number of transmit traces 116 and $t_{TX}$ is the time required to apply the drive signal to a transmit trace 116. Because the scanning mode implemented by the in-cell touchscreen panel 100 of FIG. 1 applies a drive signal to the transmit traces 116 one at a time, N also represents the number of cycles that are needed to produce a drive signal at all of the transmit traces 116. As the number of transmit traces 116 comprising the in-cell touchscreen panel 100 increases, the sensing time $t_s$ increases accordingly. The increase in sensing time $t_s$ can be problematic because the time allowed for touchscreen panel scanning is limited by the display refresh rate of the touchscreen panel 100. When the sensing time $t_s$ exceeds the amount of time allowed by the display refresh rate of the touchscreen panel 100, the sampling efficiency is reduced, and the touch-detection output is more susceptible to noise and may have a lower signal-to-noise ratio.

Figure 2:
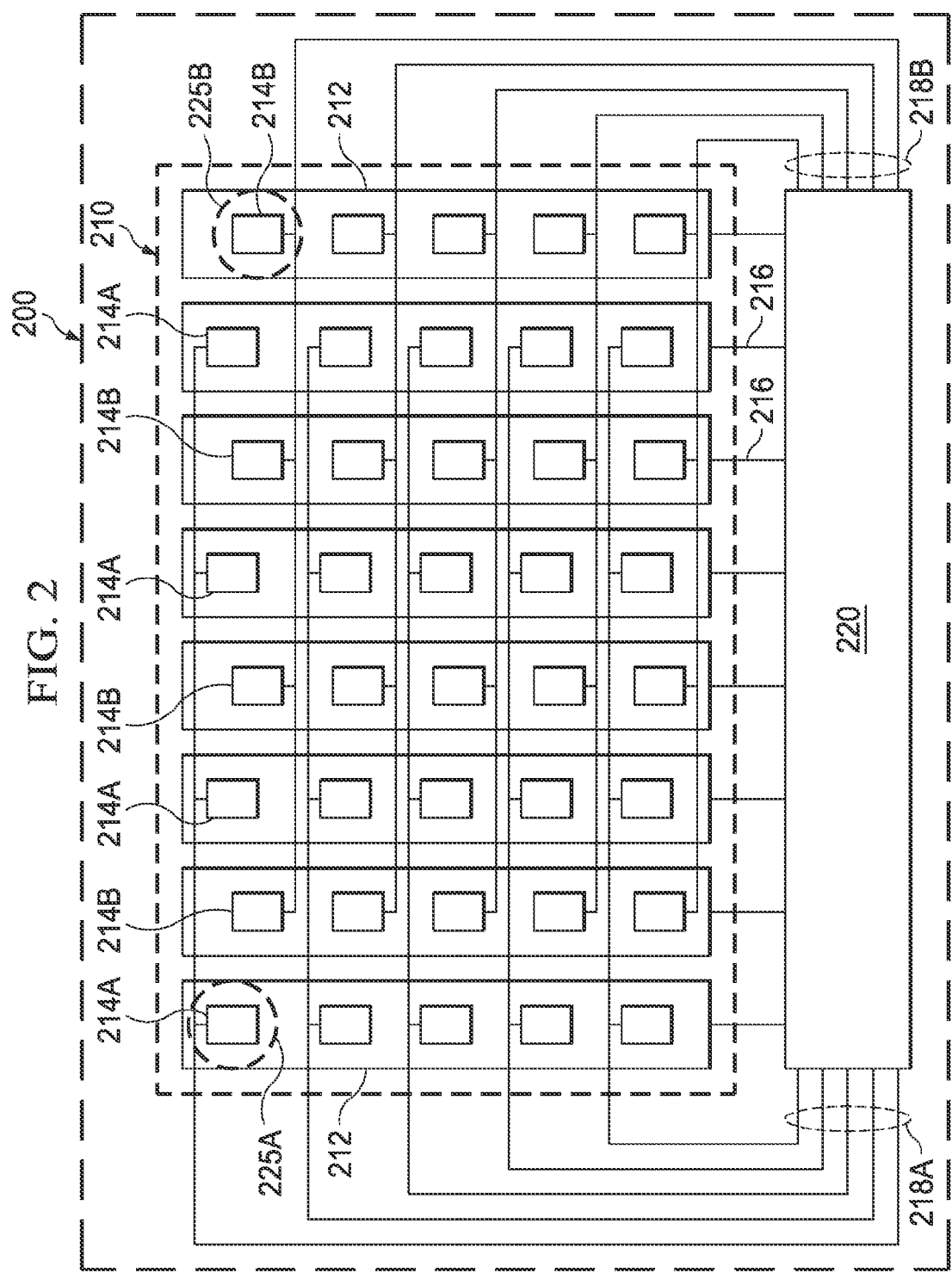
FIG. 2 illustrates an example in-cell touchscreen panel in accordance with an embodiment of the present disclosure.

FIG. 2 illustrates an example in-cell touchscreen panel 200 in accordance with an embodiment of the present disclosure, wherein the in-cell touchscreen panel 200 may be installed in an electronic device such as a smart phone, GPS device, tablet computer, mobile media player, remote control device, or any other device capable of using an in-cell touchscreen panel. The in-cell touchscreen panel 200 in FIG. 2 includes an active portion 210 capable of displaying content and detecting a user touch. Disposed substantially within the perimeter of the active portion 210, the in-cell touchscreen panel 200 includes columns of transmit electrodes 212 and rows of sensing electrodes 214. Each column of transmit electrodes 212 is coupled to one of a set of transmit traces 216 that are, in turn, coupled to control circuitry 220. As explained in greater detail below, the in-cell touchscreen panel 200 implements a pattern wherein each row of sensing electrodes 214 is coupled to a plurality of (in this example, two) receiving traces 218 that are, in turn, coupled to the control circuitry 220. Thus, each row of sensing electrodes 214 is comprised of a first subset of sensing electrodes 214A (also referred to herein as first sensing electrodes) and a second subset of sensing electrodes 214B (also referred to herein as second sensing electrodes). The first subset of sensing electrodes 214A in each row are coupled to the control circuitry 220 via one of a first subset of the receiving traces 218A (also referred to herein as first receiving traces), and the second subset of sensing electrodes 214B in each row are coupled to the control circuitry 220 via one of a second subset of the receiving traces 218B also referred to herein as second receiving traces).

The control circuitry 220 may include circuitry for providing a drive signal to the transmit electrodes 212 via the transmit traces 216. The control circuitry 220 may also include circuitry for processing sense signals received via the first subset of receiving traces 218A and for processing sense signals received via the second subset of receiving traces 218B. The sense signals received via the first subset of receiving traces 218A are indicative of sensed capacitance generated at nodes (e.g., node 225A in FIG. 2) where the first subset of sensing electrodes 214A intersect the transmit electrodes 212, and the sense signals received via the second subset of receiving traces 218B are indicative of sensed capacitance generated at nodes (e.g., node 225B in FIG. 2) where the second subset of sensing electrodes 214B intersect the transmit electrodes 212. It should be apparent to one of ordinary skill in the art that the term "intersect" as used herein does not require that a transmit electrode and sensing electrode physically interconnect with each other, but rather that the respective transmit electrode and sensing electrode are capable of enabling a capacitive coupling to each other. The control circuitry 220 may also include logic circuitry for processing signals and conveying touch information to other parts of the electronic device, such as a processor.

In the embodiment illustrated in FIG. 2, the transmit electrodes 212 each extend in a first direction and are arranged as shown in FIG. 2 to form what is referred to herein as columns of transmit electrodes 212. The rows of sensing electrodes 214 each extend in a second direction substantially perpendicular to the first direction and, in the embodiment illustrated in FIG. 2, are each configured such that the first sensing electrodes 214A alternate with the second sensing electrodes 214B. A first receiving trace 218A coupled to the first subset of sensing electrodes 214A in a row extends along the second direction across the columns of transmit electrodes 212 and connects the first subset of sensing electrodes 214A in series. Similarly, a second receiving trace 218B coupled to the second subset of sensing electrodes 214B in the row extends along the second direction across the columns of transmit electrodes 212 and connects the second subset of sensing electrodes 214B in series. The rows of sensing electrodes 214 are also configured such that a single sensing electrode 214 in a particular row intersects a single one of the columns of transmit electrodes 212.

In some embodiments, the in-cell touchscreen panel 200 is capable of enabling multi-touch functionality by operating in a scanning mode where capacitance is measured at each node at which the sensing electrodes 214 intersect the transmit electrodes 212 (e.g., nodes 225A and 225B in FIG. 2). During the scanning mode, the control circuitry 220 simultaneously senses the first subset of receiving traces 218A and the second subset of the receiving traces 218B while applying drive signals to the transmit traces 216 of the transmit electrodes 212. However, instead of applying the drive signals to the transmit traces 216 one at a time, the drive signals are applied simultaneously to pairs of transmit traces 216, as further explained below. After a drive signal has been applied to each of the transmit electrodes 212, each of the nodes are measured to detect a capacitance. This capacitance is indicative of a user touch on the in-cell touchscreen panel 200. As discussed herein, the scanning mode assumes that each transmit trace 216 is connected to a single transmit electrode 212 and that each transmit electrode 212 is coupled to the control circuitry 220 via one transmit trace 216.

Because each row of sensing electrodes 214 is comprised of a first subset of sensing electrodes 214A connected to a first subset of receiving traces 218A and a second subset of sensing electrodes 214B connected to a second subset of receiving traces 218B, each row of sensing electrodes 214 is capable of simultaneously providing sense signals originating from two different locations: (i) where the first subset of sensing electrodes 214A in the row intersect first ones of the transmit electrodes 212, and (ii) where the second subset of sensing electrodes 214B in the row intersect second ones of the transmit electrodes 212. Accordingly, the control circuitry 220 is capable of simultaneously processing the capacitance sensed at the first sensing electrodes 214A in each row and the capacitance sensed at the second sensing electrodes 214B in each row. To exploit this capability for the purpose of reducing the sensing time $t_s$ of the scanning mode, the control circuitry 220 simultaneously applies drive signals to the transmit traces 216 of two transmit electrodes 212 during a cycle, wherein a first one of these two transmit electrodes 212 intersects the first subset of sensing electrodes 214A and a second one of these two transmit electrodes 212 intersects the second subset of sensing electrodes 214B. By increasing the number of transmit traces 216 receiving a drive signal in a single cycle, the number of cycles needed to drive all of the transmit electrodes 212 is reduced. In other words, the in-cell touchscreen panel 200 is capable of reducing the sensing time $t_s$ by reducing the number of cycles needed to produce drive signals for all of the transmit electrodes 212 in the panel 200.

The sensing time $t_s$ for operating in the scanning mode described above may be approximated in accordance with the following equation: $t_s = C^* t_{TX}$, where C is the number of cycles needed to produce drive signals for all of the transmit electrodes 212 in the in-cell touchscreen panel 200 and $t_{TX}$ is the time it takes to apply the drive signal(s) during a cycle. When the in-cell touchscreen panel 200 contains an even number of transmit electrodes 212, C=(N/2), where N is the number of transmit electrodes 212 comprising the touchscreen panel 200. When the in-cell touchscreen panel 200 contains an odd number of transmit electrodes 212, C=(N+1)/2. When compared to the in-cell touchscreen panel 100 of FIG. 1, the in-cell touchscreen panel 200 of FIG. 2 is capable of reducing the sensing time $t_s$ by as much as 50%. Accordingly, the disclosed in-cell touchscreen panel 200 is capable of achieving greater accumulation/averaging in the same amount of time, which results in higher SNR and smaller sensing bandwidth, thereby providing better resistance to external noise. Additionally, the disclosed in-cell touchscreen panel 200 can accommodate a higher refresh rate than the conventional in-cell touchscreen panel 100 of FIG. 1.

Figure 3:
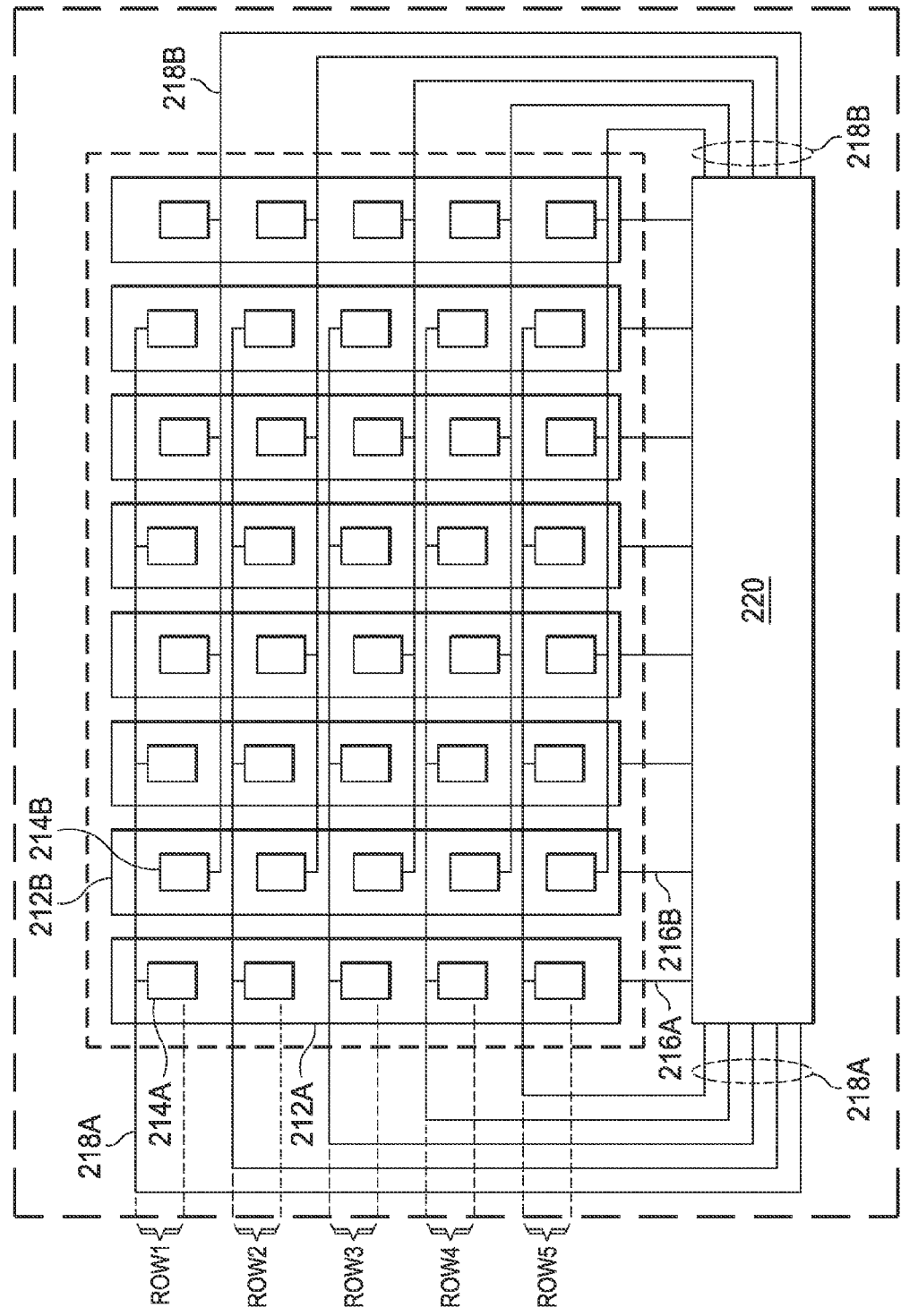
FIG. 3 illustrates the in-cell touchscreen panel of FIG. 2 in accordance with an example scanning mode.

An example of the aforementioned scanning mode is now discussed with reference to FIG. 3, which illustrates the in-cell touchscreen panel 200 of FIG. 2. As shown in FIG. 3, rows of sense electrodes 214 (Row1-Row5) each include a first sense electrode 214A intersecting a first transmit electrode 212A and a second sense electrode 214B intersecting a second transmit electrode 212B. The first sense electrodes 214A in each row are connected to the control circuitry 220 via a first receiving trace 218A, and the second sense electrodes 214B in each row are connected to the control circuitry 220 via a second receiving trace 218B. During the scanning mode, the control circuitry 220 senses all the receiving traces 218 (i.e., receives sense signals from all the receiving traces 218) while applying drive signals to pairs of transmit electrodes 212. During a first cycle of the scanning mode, the control circuitry 220 applies drive signals to the transmit traces 216A and 216B of transmit electrodes 212A and 212B and receives the sense signals from the receiving traces 218. This process is repeated for the remaining pairs of transmit electrodes 212 until drive signals have been applied to the transmit traces 216 of all transmit electrodes 212 and the corresponding sense signals have been received from the receiving traces 218. During each subsequent cycle, the control circuitry 220 applies drive signals to the transmit traces 216 of one of the remaining pairs of transmit electrodes 212 and continues to receive the sense signals from the receiving traces 218. If the in-cell touchscreen panel 200 contains an odd number of transmit electrodes 212, a drive signal is applied to the transmit trace 216 of the single remaining transmit electrode 212 during the final cycle. After a drive signal has been applied to each of the transmit traces 216, and the sense signals have been received by the control circuitry 220, the capacitance at each node is measured to detect a user touch on the in-cell touchscreen panel 200.

Figure 4A:
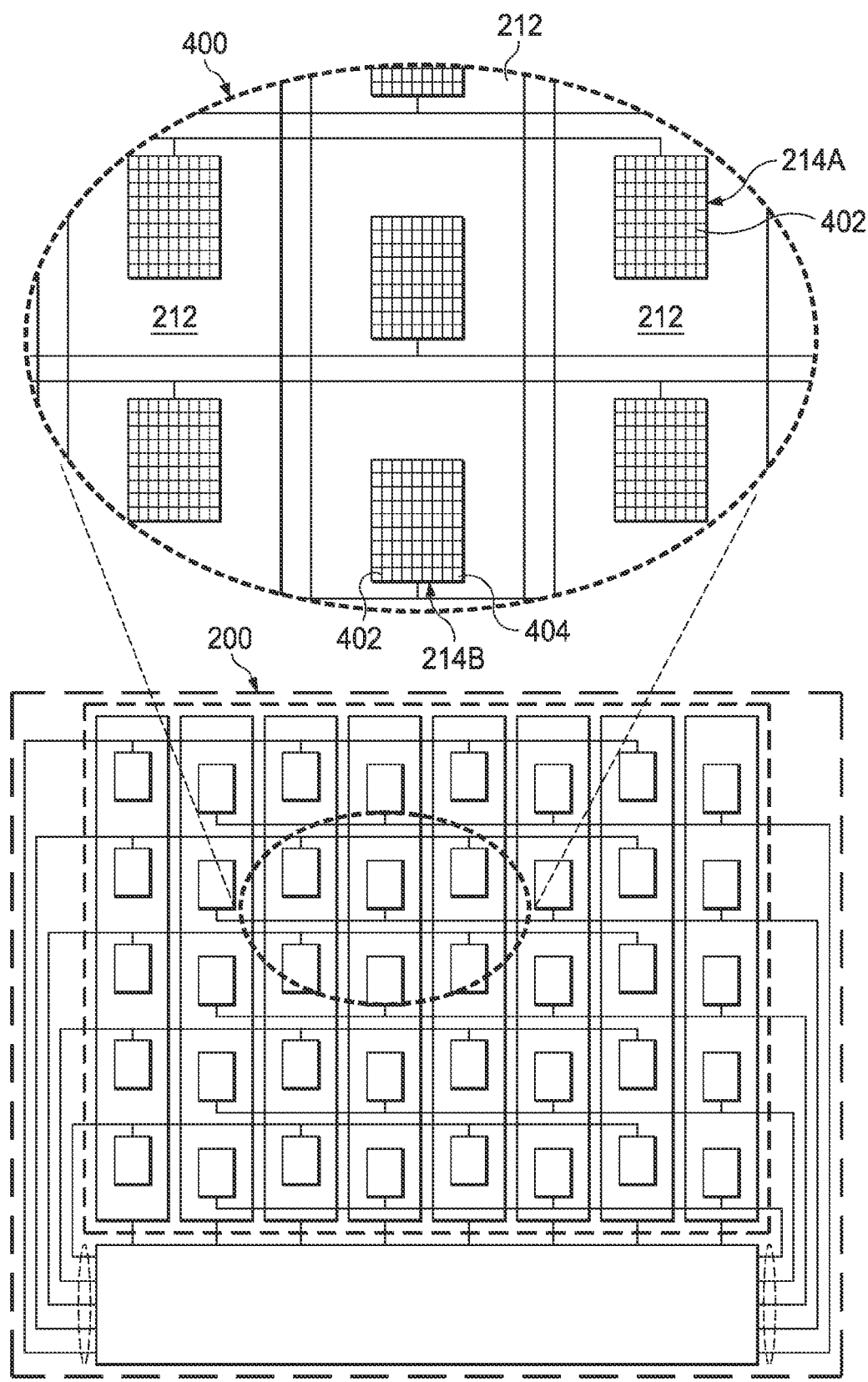
FIGS. 4A and 4B illustrate detailed views of an embodiment of a pattern used to form the sensor electrodes comprising the in-cell touchscreen panel of FIG. 2.
Figure 4B:
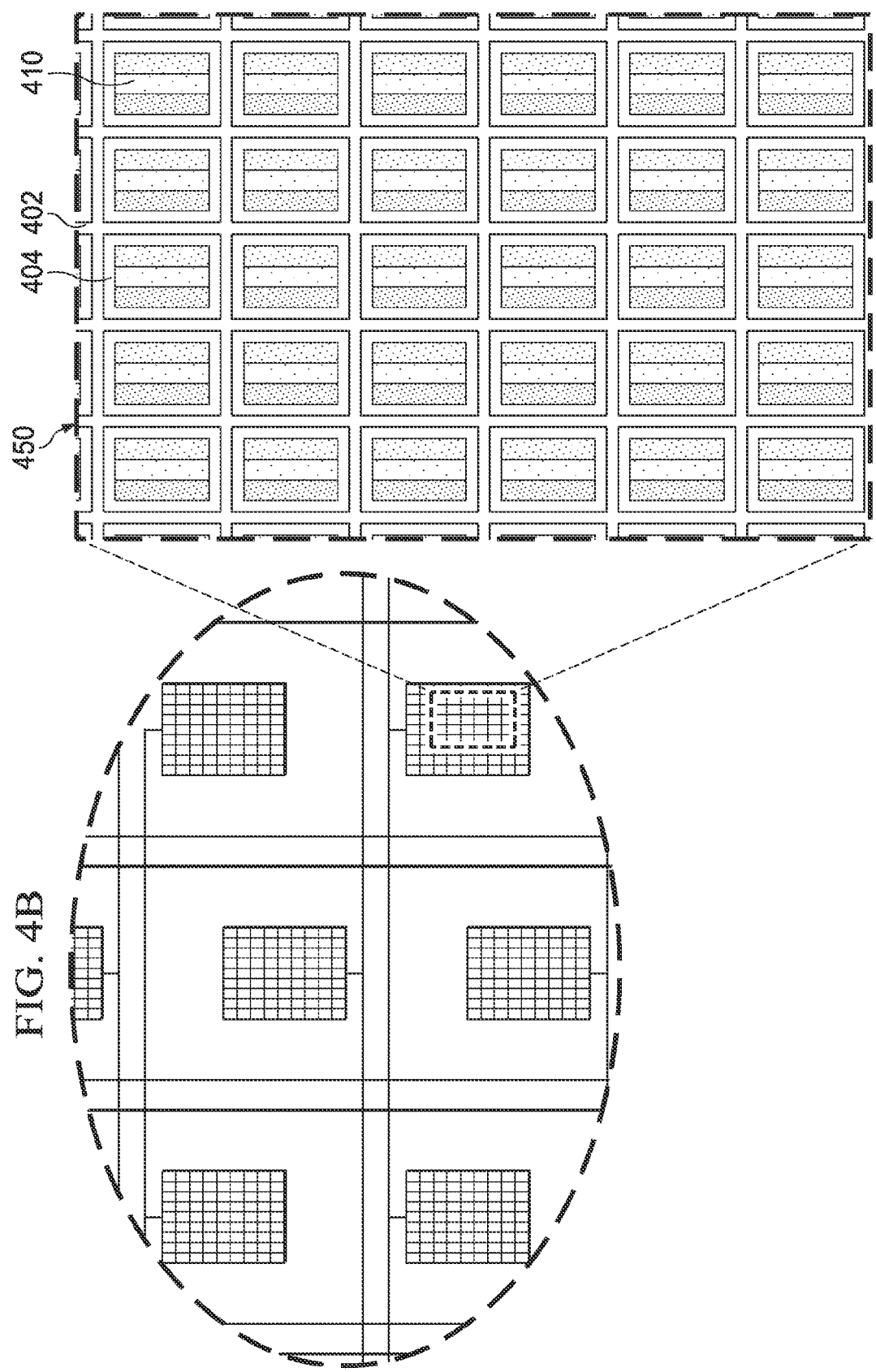

FIGS. 4A and 4B illustrate detailed views of an embodiment of a pattern used to form the sensor electrodes 214 comprising the in-cell touchscreen panel 200 of FIG. 2. FIG. 4A provides a close-up view 400 of the display portion of the in-cell touchscreen panel 200. The view 400 in FIG. 4A illustrates the sensor electrodes 214 each having a rectangular structure formed of a metallic mesh 402 having a hatched pattern defining openings 404 in the sensor electrode 214. FIG. 4B illustrates a close-up view 450 of the mesh 402 shown in FIG. 4A. In the embodiment illustrated in FIG. 4B, the display portion of the touchscreen panel 200 includes an array of pixels 410. The pattern of the sensor electrodes 214 is designed such that the mesh 402 of each sensor electrode 214 overlays the pixel array so that the pixels 410 are positioned at the openings 404 in the mesh 402. Specifically, the mesh 402 is positioned in the dark space between adjacent pixels 410 comprising the display portion of the panel 200 so that light produced by the pixels 410 is viewable through the openings 404 in the mesh 402. Furthermore, the spacing between the sensor electrode pattern and the pixels 410 of the in-cell touchscreen panel 200 is small enough that the mesh 402 comprising each sensor electrode 214 does not obstruct the light from the pixels 410, even when viewed from an angle, and therefore is not visible to a user. It should be appreciated that the pattern illustrated in FIGS. 4A and 4B is one example of a sensor electrode pattern of a particular shape, design and size. Modifications to this pattern are anticipated by the present disclosure.

Figure 5:
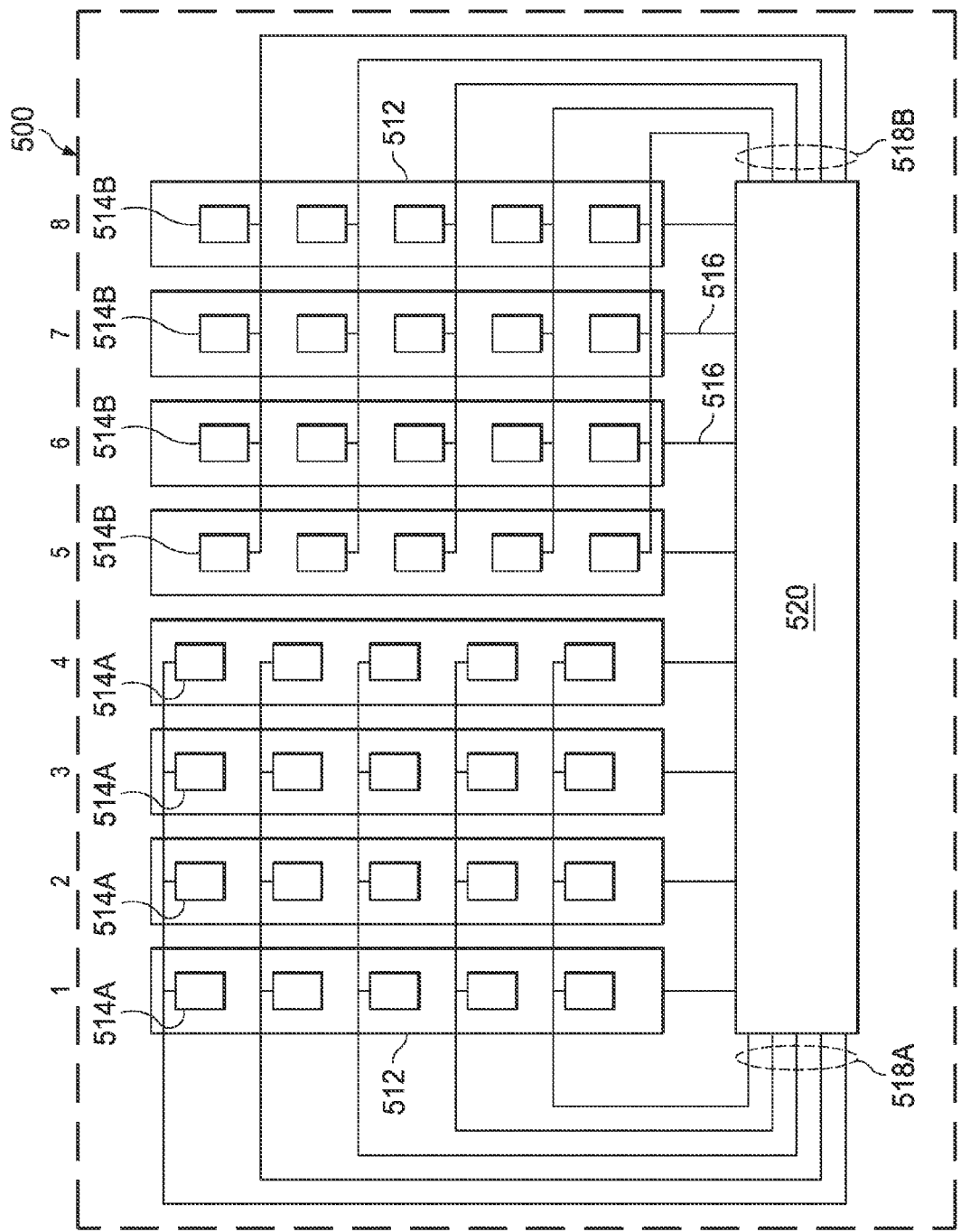
FIG. 5 illustrates an alternate embodiment of an in-cell touchscreen panel.

It should be appreciated that various modifications may be made to the disclosed in-cell touchscreen panel, without departing from the scope of the present disclosure as set forth in the claims below. For example, FIG. 5 illustrates an example embodiment of an in-cell touchscreen panel 500 having a first subset of sensing electrodes 514A and second subset of sensing electrodes 514B arranged in a different pattern than that illustrated in FIG. 2. As shown in FIG. 5, the first subset of sensing electrodes 514A are arranged sequentially and in series, and are connected to the control circuitry 520 via one of a first subset of receiving traces 518A. Additionally, the second subset of sensing electrodes 514B are arranged sequentially and in series, and are connected to the control circuitry 520 via one of a second subset of receiving traces 518B. The first and second subsets of sensing electrodes 514 are adjacent in each row. The example in-cell touchscreen panel 500 generally operates in a manner similar to that discussed above with respect to the in-cell touchscreen panel 200 of FIG. 2. For example, during the scanning mode, the control circuitry 520 simultaneously senses the first subset of receiving traces 518A and the second subset of receiving traces 518B while applying drive signals to the transmit traces 516 of two transmit electrodes 512 during a cycle, wherein a first one of these two transmit electrodes 512 (e.g., transmit electrode 512 in Column 1) intersects the first subset of sensing electrodes 514A and a second one of these two transmit electrodes 512 (e.g., transmit electrode 512 in Column 8) intersects the second subset of sensing electrodes 514B. After a drive signal has been applied to each of the transmit traces 516, and the sense signals have been received by the control circuitry 520, the capacitance at each node is measured to detect a user touch on the in-cell touchscreen panel 500.

Additionally, it should be appreciated that, in some embodiments, each row of sensing electrodes may comprise additional subsets of sensing electrodes (i.e., more than two subsets of sensing electrodes), wherein each additional subset of sensing electrodes is coupled to the control circuitry via additional subsets of receiving traces. For example, in some embodiments, a row of sensing electrodes may comprise three subsets of sensing electrodes coupled to the control circuitry via three subsets of receiving traces.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A touchscreen panel, comprising:
    a plurality of transmit electrodes with each transmit electrode extending in a first direction along a display portion of the touchscreen panel;
    one or more rows of sensing electrodes extending in a second direction along the display portion of the touchscreen panel substantially perpendicular to the first direction and intersecting the plurality of transmit electrodes, each row of sensing electrodes comprising a first subset of sensing electrodes coupled to a first subset of receiving traces and a second subset of sensing electrodes coupled to a second subset of receiving traces; and
    control circuitry configured to apply drive signals simultaneously to the transmit electrodes of each pair of a plurality of pairs of transmit electrodes, wherein a first transmit electrode in every pair of transmit electrodes intersects the first subset of sensing electrodes but not the second subset of sensing electrodes and a second transmit electrode in every pair of transmit electrodes intersects the second subset of sensing electrodes but not the first subset of sensing electrodes.

2. The in cell touchscreen panel of claim 1, further comprising a plurality of transmit traces, each coupled to one of the transmit electrodes and operable to couple the transmit electrodes to the control circuitry.

3. The touchscreen panel of claim 1, wherein the control circuitry is further operable to receive:
    first sense signals from the first subset of sensing electrodes, and
    second sense signals from the second subset of sensing electrodes.

4. The touchscreen panel of claim 3, wherein the first sense signals are indicative of sensed capacitance at locations where the first subset of sensing electrodes intersect the first transmit electrode, and the second sense signals are indicative of sensed capacitance at locations where the second subset of sensing electrodes intersect the second transmit electrode.

5. The in cell touchscreen panel of claim 1, wherein one or more of the sensing electrodes comprise a mesh defining a plurality of openings.

6. The touchscreen panel of claim 5, wherein the mesh overlies pixels comprising the display portion of the touchscreen panel such that individual ones of the pixels are each positioned at one of a plurality of openings in the mesh.

7. The touchscreen panel of claim 5, wherein the mesh is disposed between adjacent pixels comprising the display portion of the touchscreen panel.

8. A touchscreen panel, comprising:
    a plurality of pairs of transmit electrodes, each pair of transmit electrodes comprising a first transmit electrode extending in a first direction along a display portion of the touchscreen panel and a second transmit electrode extending in the first direction along the display portion of the touchscreen panel;
    one or more rows of sensing electrodes extending in a second direction along the display portion of the touchscreen panel substantially perpendicular to the first direction and intersecting the pairs of transmit electrodes, each row of sensing electrodes comprising a first subset of sensing electrodes each intersecting one of the first transmit electrodes of each pair of the plurality of pairs but not the second transmit electrode in that pair and a second subset of sensing electrodes each intersecting one of the second transmit electrodes of each pair of the plurality of pairs but not the first transmit electrode in that pair; and
    control circuitry configured to apply drive signals simultaneously to each pair of the plurality of pairs of transmit electrodes.

9. The in cell touchscreen panel of claim 8, wherein the control circuitry is further configured to receive first sense signals from the first subset of sensing electrodes and second sense signals from the second subset of sensing electrodes.

10. The touchscreen panel of claim 9, wherein the first sense signals are indicative of sensed capacitance at locations where the first subset of sensing electrodes intersect the first transmit electrode of said pair of transmit electrodes, and the second sense signals are indicative of sensed capacitance at locations where the second subset of sensing electrodes intersect the second transmit electrode of said pair of transmit electrodes.

11. The touchscreen panel of claim 8, further comprising a plurality of transmit traces, each coupled to one of the transmit electrodes and operable to couple the transmit electrodes to the control circuitry.

12. The touchscreen panel of claim 8, wherein one or more of the sensing electrodes comprise a mesh defining a plurality of openings.

13. The touchscreen panel of claim 12, wherein the mesh overlies pixels comprising the display portion of the touchscreen panel such that individual ones of the pixels are each positioned at one of a plurality of openings in the mesh.

14. The touchscreen panel of claim 12, wherein the mesh is disposed between adjacent pixels comprising the display portion of the touchscreen panel.

15. A method for detecting a user touch using a touchscreen panel, the method comprising:
- receiving sensing signals via a plurality of receiving traces, wherein a first subset of the receiving traces are coupled to first sensing electrodes in rows extending in a first direction along a display portion of the in cell touchscreen panel and a second subset of the receiving traces are coupled to second sensing electrodes in the rows extending in the first direction along the display portion of the in cell touchscreen panel;
- applying drive signals simultaneously to transmit electrodes of each pair of a plurality of pairs of transmit electrodes extending in a second direction along the display portion of the touchscreen panel perpendicular to the first direction, wherein a first transmit electrode in every pair of transmit electrodes intersects first sensing electrodes of the first subset of receiving traces but does not intersect the second sensing electrodes, and a second transmit electrode in every the pair of transmit electrodes intersects second sensing electrodes of the second subset of receiving traces but does not intersect the first sensing electrodes; and
- measuring a capacitance formed at nodes where one or more of the first sensing electrodes intersect the first transmit electrode and at nodes where one or more of the second sensing electrodes intersect the second transmit electrode.

16. The method of claim 15, further comprising applying a drive signal to a single transmit electrode extending in the second direction and measuring a capacitance formed at nodes where one or more of the first sensing electrodes intersect the single transmit electrode.

17. The method of claim 15, wherein receiving sensing signals comprises receiving first sense signals via the first subset of the receiving traces and receiving second sense signals via the second subset of the receiving traces.

18. The method of claim 17, wherein the first sense signals are indicative of the capacitance formed at the nodes where the one or more of the first sensing electrodes intersect the first transmit electrode of said pair of transmit electrodes, and the second sense signals are indicative of the capacitance formed at the nodes where the one or more of the second sensing electrodes intersect the second transmit electrode of said pair of transmit electrodes.

* * * * *

UNITED STATES PATENT AND TRADEMARK OFFICE
CERTIFICATE OF CORRECTION

PATENT NO. : 9,244,560 B2
APPLICATION NO. : 13/862562
DATED : January 26, 2016
INVENTOR(S) : Kusuma Adi Ningrat Page 1 of 1

It is certified that error appears in the above-identified patent and that said Letters Patent is hereby corrected as shown below:

In the Claims:

At column 8, claim number 2, line number 1, please delete the words "in cell".

At column 8, claim number 5, line number 17, please delete the words "in cell".

At column 8, claim number 9, line number 49, please delete the words "in cell".

At column 9, claim number 15, line numbers 13 and 17, please delete the words "in cell".

At column 9, claim number 15, line number 26, please delete the word "the".

Signed and Sealed this
Twenty-sixth Day of July, 2016

Michelle K. Lee
*Director of the United States Patent and Trademark Office*